(12) United States Patent
Lu et al.

(10) Patent No.: US 9,535,566 B2
(45) Date of Patent: Jan. 3, 2017

(54) METHOD, APPARATUS AND SYSTEM OF DISPLAYING A FILE

(75) Inventors: Jun Lu, Shanghai (CN); Yipeng Yang, Shanghai (CN); Edwin L. Wang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 13/997,752

(22) PCT Filed: Aug. 24, 2012

(86) PCT No.: PCT/CN2012/080537
§ 371 (c)(1),
(2), (4) Date: Nov. 6, 2013

(87) PCT Pub. No.: WO2014/029101
PCT Pub. Date: Feb. 27, 2014

(65) Prior Publication Data
US 2015/0040061 A1 Feb. 5, 2015

(51) Int. Cl.
*G06F 3/00* (2006.01)
*G06F 3/048* (2013.01)
(Continued)

(52) U.S. Cl.
CPC ......... *G06F 3/0481* (2013.01); *G06F 3/04842* (2013.01); *G06F 3/1462* (2013.01);
(Continued)

(58) Field of Classification Search
None
See application file for complete search history.

(56) References Cited

U.S. PATENT DOCUMENTS

| | | | | |
|---|---|---|---|---|
| 5,196,838 A | * | 3/1993 | Meier | G06F 3/04812 345/684 |
| 5,546,520 A | * | 8/1996 | Cline | G06F 3/0481 345/649 |

(Continued)

FOREIGN PATENT DOCUMENTS

| | | |
|---|---|---|
| CN | 1221909 A | 7/1999 |
| CN | 102449587 A | 5/2012 |

(Continued)

OTHER PUBLICATIONS

Sašo Matejina, Touch-scroll Jquery Plugin—How to Init with different options for multiple instances?, Dec. 11, 2011, 10 pages.*

(Continued)

*Primary Examiner* — Yongjia Pan
(74) *Attorney, Agent, or Firm* — Barnes & Thornburg LLP (57) ABSTRACT

A device, method and system of displaying a file on a mobile communication device may comprise duplicating at least a leftmost part of a file to obtain a duplicated leftmost part of the file, and displaying a frame through moving a display window along the frame, the frame comprising a rightmost part of the file and the duplicated leftmost part of the file, wherein the duplicated leftmost part of the file is placed on right of the rightmost part of the file. In some embodiments, the mobile communication device may control the display window to automatically move to a leftmost side of the frame, if the display window moves to a rightmost side of the frame, and further in response to a user instruction of continuing viewing the file.

21 Claims, 4 Drawing Sheets

(51) Int. Cl.
*G06F 3/0481* (2013.01)
*G06F 3/14* (2006.01)
*G09G 5/14* (2006.01)
*G06F 3/0484* (2013.01)
*G09G 5/42* (2006.01)

(52) U.S. Cl.
CPC ............. *G09G 5/14* (2013.01); *G09G 5/42* (2013.01); *G09G 2370/022* (2013.01)

(56) References Cited

U.S. PATENT DOCUMENTS

| | | | | |
|---|---|---|---|---|
| 5,581,275 | A * | 12/1996 | Glei | A61B 5/044 715/784 |
| 5,677,708 | A * | 10/1997 | Matthews, III | G06F 3/0482 348/E5.104 |
| 5,749,082 | A * | 5/1998 | Sasaki | G09G 5/343 345/685 |
| 5,903,267 | A * | 5/1999 | Fisher | G06F 3/04855 345/157 |
| 5,943,051 | A * | 8/1999 | Onda | G06F 3/0334 345/661 |
| 6,034,668 | A * | 3/2000 | Jackson | G06F 3/0317 341/13 |
| 6,147,670 | A * | 11/2000 | Rossmann | G09G 5/343 345/685 |
| 6,337,697 | B1 | 1/2002 | Kim | |
| 6,499,043 | B1 * | 12/2002 | Forcier | G06F 3/0488 715/273 |
| 6,690,365 | B2 * | 2/2004 | Hinckley | G06F 3/03547 345/173 |
| 7,249,325 | B1 * | 7/2007 | Donaldson | G06F 3/03547 345/169 |
| 7,320,105 | B1 * | 1/2008 | Sinyak | G06F 3/0485 715/204 |
| 7,844,915 | B2 * | 11/2010 | Platzer | G06F 3/04845 345/173 |
| 7,872,652 | B2 * | 1/2011 | Platzer | G06F 1/1616 345/473 |
| 8,090,712 | B2 * | 1/2012 | Shellshear | G06F 3/0481 707/723 |
| 8,255,787 | B2 * | 8/2012 | Carraher | G06F 17/2235 707/755 |
| 8,397,246 | B2 * | 3/2013 | Jalon | G06F 17/30126 715/783 |
| 8,769,430 | B2 * | 7/2014 | Miller | G06F 3/0485 715/700 |
| 8,812,985 | B2 * | 8/2014 | Akella | G06F 3/0482 345/647 |
| 8,881,050 | B2 * | 11/2014 | Kim | G06F 3/0485 345/156 |
| 8,954,852 | B2 * | 2/2015 | Oetzel | G06F 3/04855 348/734 |
| 9,035,967 | B2 * | 5/2015 | Jakab | G09G 5/34 345/619 |
| 9,182,897 | B2 * | 11/2015 | Rogers | G06F 3/0482 |
| 2007/0118810 | A1 * | 5/2007 | Ubillos | G06F 3/04855 715/788 |
| 2008/0168384 | A1 * | 7/2008 | Platzer | G06F 3/04845 715/784 |
| 2009/0231271 | A1 * | 9/2009 | Heubel | G06F 3/016 345/156 |
| 2010/0175027 | A1 * | 7/2010 | Young | G06F 3/04883 715/830 |
| 2011/0055752 | A1 * | 3/2011 | Rubinstein | G06F 3/0485 715/784 |
| 2011/0093812 | A1 * | 4/2011 | Fong | G06F 3/0485 715/810 |
| 2011/0202859 | A1 * | 8/2011 | Fong | G06F 3/04883 715/769 |
| 2011/0252362 | A1 * | 10/2011 | Cho | G06F 3/0485 715/784 |
| 2012/0036473 | A1 * | 2/2012 | Haseyama | G06F 3/016 715/784 |
| 2012/0066638 | A1 | 3/2012 | Ohri | |
| 2012/0272181 | A1 * | 10/2012 | Rogers | G06F 3/0482 715/784 |
| 2012/0278754 | A1 * | 11/2012 | Lehmann | G09G 5/34 715/784 |
| 2012/0311488 | A1 * | 12/2012 | Mouton | G06F 3/14 715/800 |
| 2013/0002707 | A1 * | 1/2013 | Jakab | G09G 5/34 345/619 |

FOREIGN PATENT DOCUMENTS

| | | |
|---|---|---|
| CN | 102508592 A | 6/2012 |
| CN | 102591853 A | 7/2012 |
| JP | 2005266589 A | 9/2005 |
| WO | 2012056974 A1 | 5/2012 |

OTHER PUBLICATIONS

Detect end of horizontal scrolling div with jQuery, May 11, 2011, 3 pages.*

UIScrollView with "Circular" scrolling, May 4, 2012, 3 pages.*

Objective C—Using a UIScrollView for Infinite Page Loops, Oct. 10, 2010, 17 pages.*

UIScrollView—Showing user more content is available on scroll, May 2011, 3 pages.*

IPhone—knowing if a UIScrollView reached the top or bottom, Oct. 9, 2011, 3 pages.*

International Search Report and Written Opinion received for PCT Application No. PCT/CN2012/080537, mailed May 30, 2013, 13 pages.

"Mobile Web," Wikipedia, The Free Encyclopedia, available: [http://en.wikipedia.org/w/index.php?title=Mobile_Web &oldid=491972974], edited May 11, 2012, 6 pages.

Office Action for Chinese Patent Application No. 201280074871.7, dated Oct. 17, 2016, 8 pages.

* cited by examiner

METHOD, APPARATUS AND SYSTEM OF DISPLAYING A FILE

BACKGROUND

Nowadays, more and more people read files (e.g., web pages) on a mobile communication device, such as a smart phone, a tablet or a computer. Sometimes, the file may not be optimized for displaying on a screen of the mobile communication device. For example, the file may be wider than the screen, in which case, before starting to read next lines, people usually have to move a display window from a rightmost side of the file long-distance back to a leftmost side of the file, by pressing a left/right key on a keyboard or a sliding bar on a touch screen of the mobile communication device.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions carried by or stored on a transitory or non-transitory machine-readable (e.g., computer-readable) medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, specific arrangements or orderings of schematic elements, such as those representing devices, modules, instruction blocks, and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Figure 1:
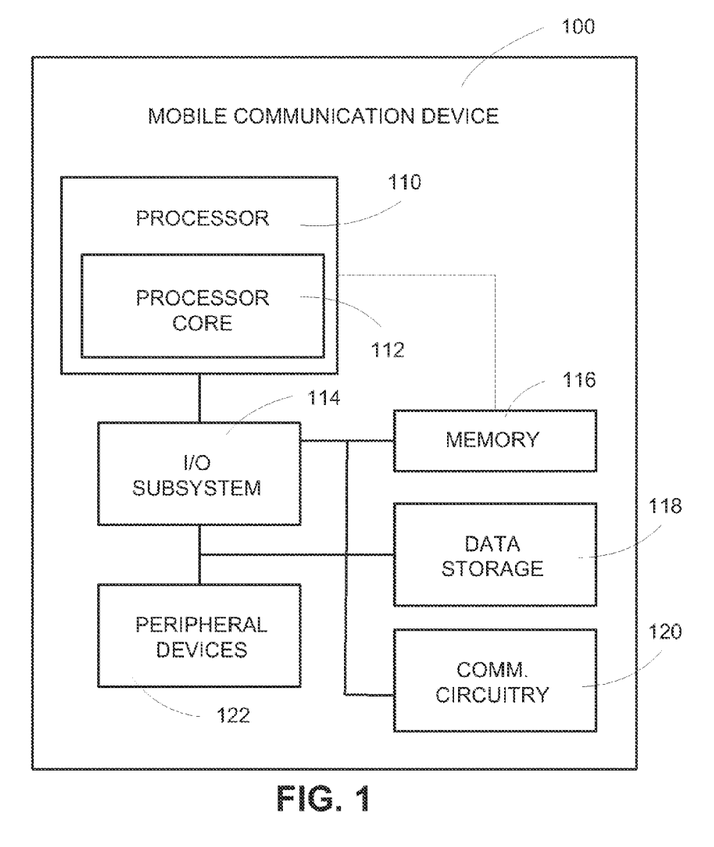
FIG. 1 illustrates an embodiment of a mobile communication device.

FIG. 1 illustrates an embodiment of a mobile communication device 100. The mobile communication device 100 includes a processor 110, an I/O subsystem 114, a memory 116, a data storage 118, a communication circuitry 120, and one or more peripheral devices 122. In some embodiments, several of the foregoing components may be incorporated on a motherboard or main board of the mobile communication device 100, while other components may be communicatively coupled to the motherboard via, for example, a peripheral port. Furthermore, it should be appreciated that the mobile communication device 100 may include other components, sub-components, and devices commonly found in a communication and/or computing device, which are not illustrated in FIG. 1 for clarity of the description.

The processor 110 of the mobile communication device 100 may be embodied as any type of processor capable of executing software/firmware, such as a microprocessor, digital signal processor, microcontroller, or the like. The processor 110 is illustratively embodied as a single core processor having a processor core 112. However, in other embodiments, the processor 110 may be embodied as a multi-core processor having multiple processor cores 112. Additionally, the mobile communication device 100 may include additional processors 110 having one or more processor cores 112.

The I/O subsystem 114 of the mobile communication device 100 may be embodied as circuitry and/or components to facilitate input/output operations with the processor 110 and/or other components of the mobile communication device 100. In some embodiments, the I/O subsystem 114 may be embodied as a memory controller hub (MCH or "northbridge"), an input/output controller hub (ICH or "southbridge"), and a firmware device. In such embodiments, the firmware device of the I/O subsystem 114 may be embodied as a memory device for storing Basic Input/Output System (BIOS) data and/or instructions and/or other information (e.g., a BIOS driver used during booting of the mobile communication device 100). However, in other embodiments, I/O subsystems having other configurations may be used. For example, in some embodiments, the I/O subsystem 114 may be embodied as a platform controller hub (PCH). In such embodiments, the memory controller hub (MCH) may be incorporated in or otherwise associated with the processor 110, and the processor 110 may communicate directly with the memory 116 (as shown by the dashed line in FIG. 1). Additionally, in other embodiments, the I/O subsystem 114 may form a portion of a system-on-a-chip (SoC) and be incorporated, along with the processor 110 and other components of the mobile communication device 100, on a single integrated circuit chip.

The processor 110 is communicatively coupled to the I/O subsystem 114 via a number of signal paths. These signal paths (and other signal paths illustrated in FIG. 1) may be embodied as any type of signal paths capable of facilitating communication between the components of the mobile communication device 100. For example, the signal paths may be embodied as any number of point-to-point links, wires, cables, light guides, printed circuit board traces, vias, bus, intervening devices, and/or the like.

The memory 116 of the mobile communication device 100 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 116 is communicatively coupled to the I/O subsystem 114 via a number of signal paths. Although only a single memory device 116 is illustrated in FIG. 1, the mobile communication device 100 may include additional memory devices in other embodiments. Various data and software may be stored in the memory 116. For example, one or more operating systems, applications, programs, libraries, and drivers that make up the software stack executed by the processor 110 may reside in memory 116 during execution.

The data storage 118 may be embodied as any type of device or devices configured for the short-term or long-term storage of data. For example, the data storage 118 may include any one or more memory devices and circuits, memory cards, hard disk drives, solid-state drives, or other data storage devices The communication circuitry 120 of the mobile communication device 100 may include any number of devices and circuitry for enabling communications between the mobile communication device 100 and one or more devices or networks as discussed in more detail below. The communication circuitry 120 may be configured to use any one or more, or combination thereof, communication protocols to communicate, such as, for example, a cellular communication protocol (e.g., Wideband Code Division Multiple Access (W-CDMA)), a wireless network communication protocol (e.g., Wi-Fi®, WiMAX), a wireless personal area network communication protocol (e.g., Bluetooth®), a wired network communication protocol (e.g., TCP/IP), and/or other communication protocols.

In some embodiments, the mobile communication device 100 may also include one or more peripheral devices 122. Such peripheral devices 122 may include any number of additional input/output devices, interface devices, and/or other peripheral devices. For example, in some embodiments, the peripheral devices 122 may include a display, touch screen, graphics circuitry, keyboard, speaker system, and/or other input/output devices, interface devices, and/or peripheral devices.

The mobile communication device 100 may be embodied as any type of communication device capable of performing the functions described herein. For example, each of the mobile communication device 100 may be embodied as, without limitation, a smart phone, a cellular telephone, a handset, a messaging device, a computer, a tablet computer, a laptop computer, a notebook computer, a mobile computing device, a work station, a network appliance, a web appliance, a distributed computing system, a multiprocessor system, a processor-based system, a consumer mobile communication device, a digital television device, and/or any other communication device configured to securely pair and exchange data.

Figure 2:
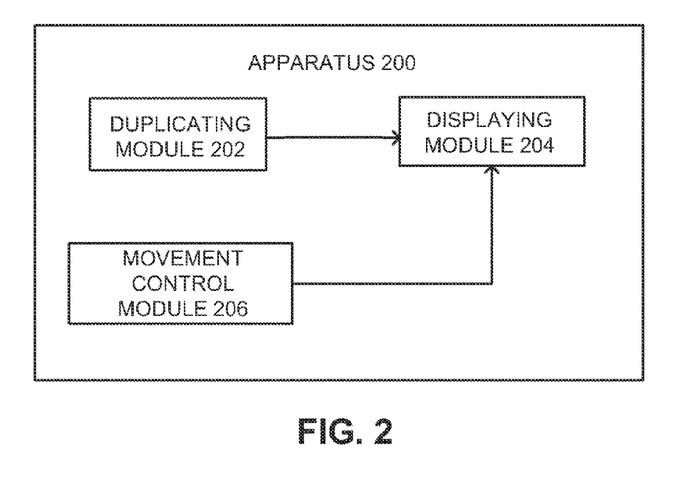
FIG. 2 illustrates an embodiment of an apparatus of the mobile communication device for displaying a file.

FIG. 2 illustrates an embodiment of an apparatus 200 of the mobile communication device 100 for displaying a file on the mobile communication device 100. In case that the file is not optimized for being displayed on the mobile communication device 100, such as a web page not in WAP format, the apparatus 200 may be configured to duplicate at least a leftmost part of a file and place it on the right of a rightmost side of the file. Herein, the file may refer to a web page or any other kinds of documents that a user can view on a display screen of the mobile communication device 100. In such way, the apparatus 200 may display the file in circle, so that the user may view the file through moving a display window continuously in right direction, rather than moving the display window from the rightmost side back to the leftmost side in order to view next lines.

The apparatus 200 may comprise a duplicating module 202, a displaying module 204 and a movement control module 206. The various modules of the apparatus 200 may be embodied as hardware, software, firmware or the combination thereof. For example, the apparatus 200 may be embedded into a web browser, book/document reader or similar applications.

The duplicating module 202 may duplicate the leftmost part of the file and place it on the right of the rightmost side of the file. In an embodiment, the duplicated leftmost part of the file may have a width at least as same as the display window.

The displaying module 204 may display the file by moving the display window along a display frame. If the display frame is larger than the file, then the display frame may contain the file and the duplicated leftmost part of the file. Examples of the display frame may be presented in FIGS. 4a-4c, which illustrate an embodiment of displaying the file, in the condition that the display frame is larger than the file. Details of the FIGS. 4a-4c will be provided in the following description. If the display frame is smaller than the file, the display frame may contain either a part of the file or the rightmost part of the file with the duplicated leftmost part of the file which is placed on the right of the rightmost part. Examples of the display frame may be presented in FIGS. 5a-5f, which illustrate another embodiment of displaying the file, in the condition that the display frame is smaller than the file. Details of the FIGS. 5a-5f will be provided in the following description.

The movement control module 206 may detect if the display window moves to a rightmost side of the display frame and control the display window to automatically move to the leftmost side of the display frame. In an embodiment, when generating the display frame, the movement control module may calculate and save a position of a predefined rightmost boundary of the display frame. If the display window moves right and exceeds the boundary, an "automatic move back to the left" mechanism may be triggered. Examples of the display window movements are presented in FIGS. 4a-4c and FIGS. 5a-5f.

In the above embodiments, since the leftmost part of the file is duplicated and placed on the right of the rightmost side of the file, and the display window automatically moves back to the leftmost side of the display frame when reaching the rightmost side of the display frame, the user may be able to view the file without the need of manipulating the move back of the display window, while feeling no disturbance of the display, especially, when the duplicated leftmost part of the file has the width at least as same as the display window.

It should be understood that other embodiments may implement other technologies for the apparatus 200. In an embodiment, the duplicating module 202 may leave a space or a mark between the rightmost part of the file and the duplicated leftmost part of the file on the display frame. In another embodiment, in order to further improve the user experience when viewing the file, especially, if the file is made of word lines, the duplicating module 202 may move up the duplicated leftmost part of the file, e.g., about one line space, and then place it on the right of the rightmost side of the file, as shown in FIG. 5f. In yet another embodiment, the duplicating module 202 may duplicate the rightmost part of the file and place it on the left of the leftmost side of the file, if the user is viewing the file through moving the display window from the right to the left.

Figure 3:
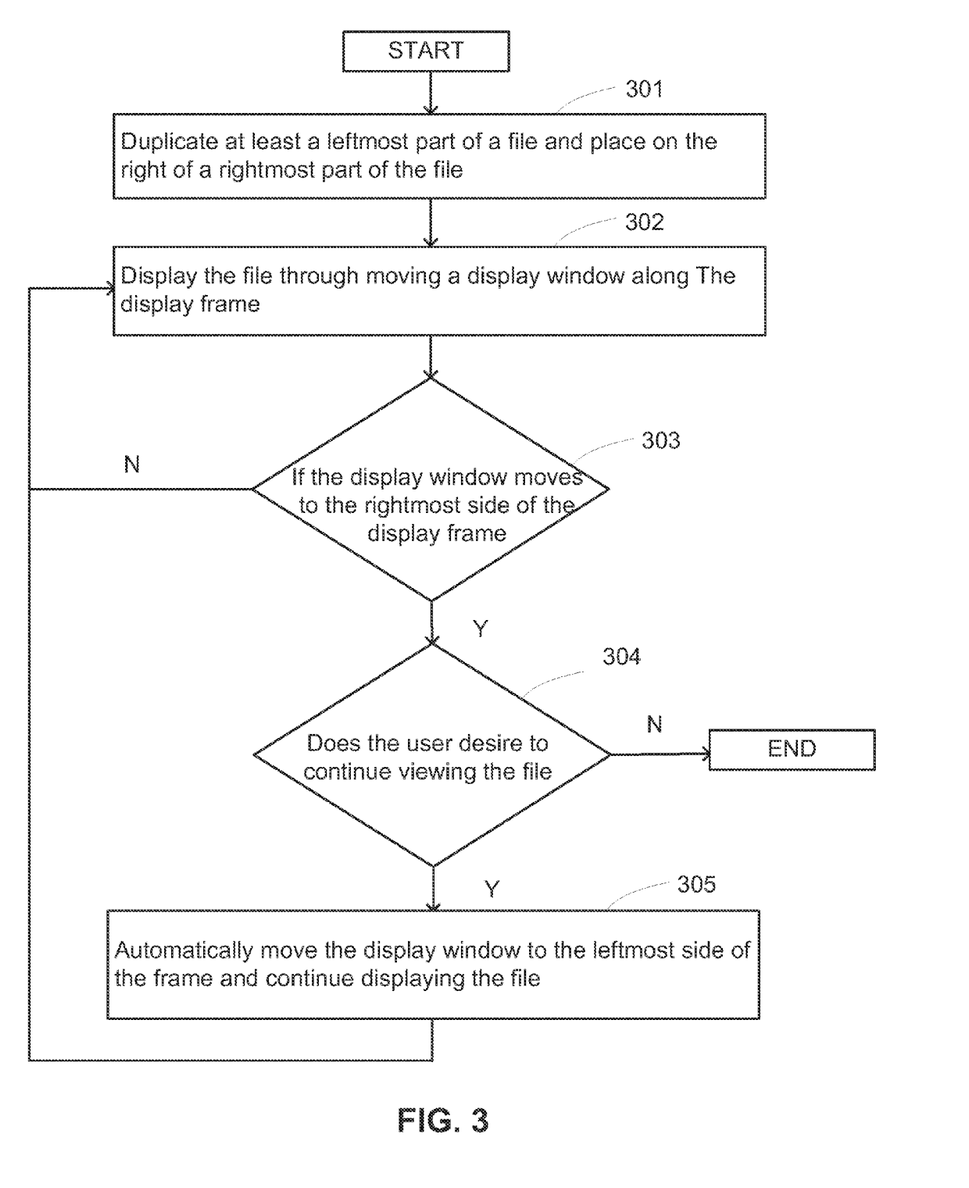
FIG. 3 illustrates an embodiment of a method of displaying the file, which may be executed by the apparatus of FIG. 2.

FIG. 3 illustrates an embodiment of a method of displaying the file, which may be executed by the apparatus 200. In block 301, the duplicating module 202 or other devices may duplicate content of at least the leftmost part of the file and place it to the right of the rightmost side of the file. In an embodiment, the duplicated leftmost part of the file may have a width at least as same as the display window. In block 302, the displaying module 204 or other devices may display the file through moving the display window along the display frame under instructions from the user, for example, through pressing a key on a keyboard or a sliding bar on a touchscreen. In an embodiment, the display frame may contain the file and the duplicated leftmost part of the file which is place on the right of the rightmost side of the file. In another embodiment, the display frame may either contain a part of the file or the rightmost part of the file with the duplicated leftmost part of the file placed to the right of the rightmost part.

In blocks 303 and 304, the movement control module 206 or other devices may detect if the display window moves to the rightmost side of the display frame and if the user desires to continue viewing the file. If yes, the movement control module 206 may automatically move the display window to the leftmost side of the display frame, so that the displaying module 204 may continue displaying the file in circle through moving the display window in one direction, e.g., in right direction, under the user instructions on the keyboard or the touchscreen. In an embodiment, when generating the display frame, the movement control module 206 may calculate and save the position of the predefined rightmost boundary of the display frame. If the display window moves right and exceeds the boundary, an "automatic move back to the left" mechanism may be triggered. Examples of the display window movements are presented in FIGS. 4a-4c and FIGS. 5a-5f.

It should be understood that other embodiments may implement other technologies for the method. In an embodiment, there may be a space or a mark between the rightmost part of the file and the duplicated leftmost part of the file on the display frame. In another embodiment, in order to further improve the user experience when viewing the file, especially, if the file is made of word lines, the duplicated leftmost part of the file may be moved up, e.g., about one line space, and then be placed to the right of the rightmost side of the file, as shown in FIG. 5f. In yet another embodiment, the rightmost part of the file may be duplicated and placed on the left of the leftmost side of the file, if the user is viewing the file through moving the display window from the right to the left.

Figure 4A:
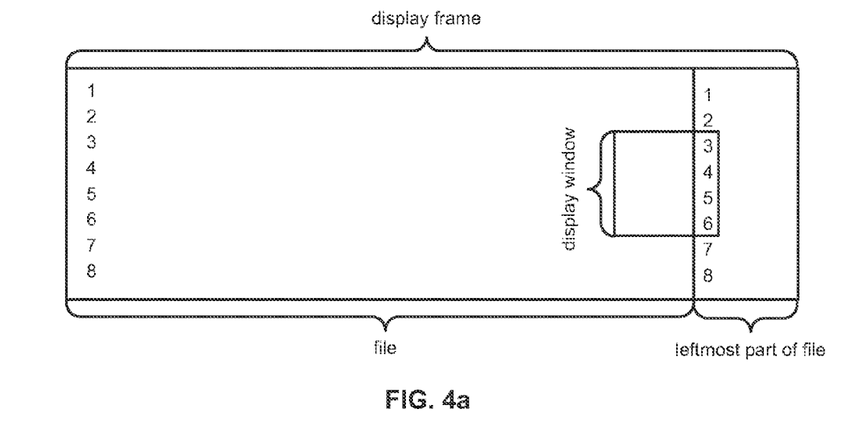
FIGS. 4a-4c illustrate an embodiment of displaying the file.
Figure 4B:
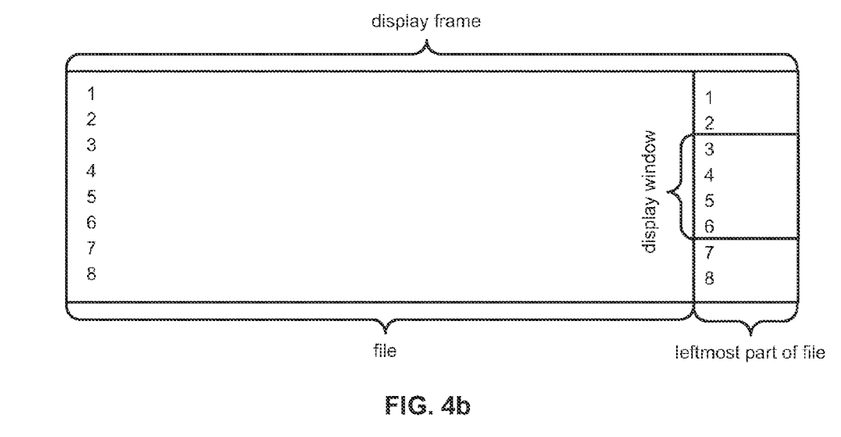
Figure 4C:
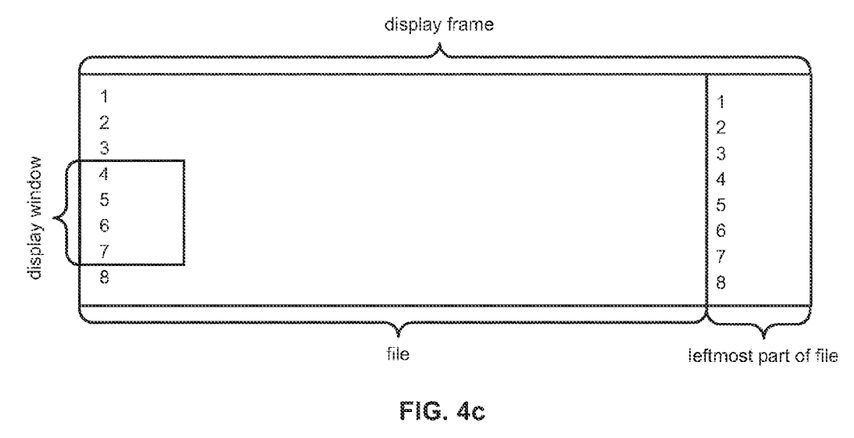

FIGS. 4a-4c illustrate an embodiment of displaying the file in case that the display frame is larger than the file. The display frame of FIGS. 4a-4c may contain the file and the duplicated leftmost part of the file. In an embodiment, the duplicated leftmost part of the file may have the width at least as same as the display window (FIG. 4a). When the display window moves to the rightmost side of the display frame (FIG. 4b), the display window may automatically move to the leftmost side of the file (FIG. 4c), so that the user may view the file without the need of manipulating the move back of the display window, while feeling no disturbance of the display.

Figure 5A:
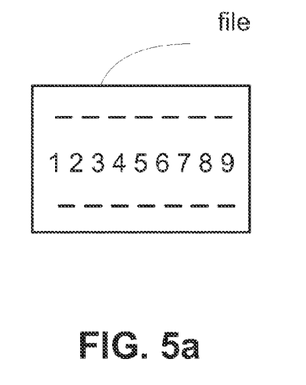
FIGS. 5a-5f illustrate another embodiment of displaying the file.
Figure 5B:
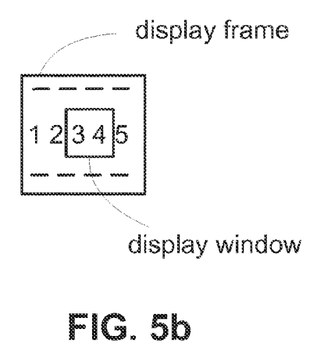
Figure 5C:
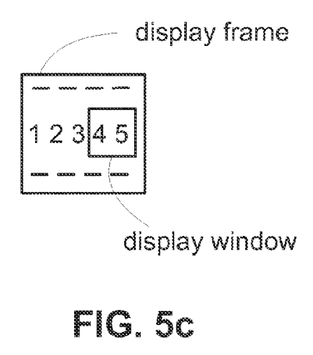
Figure 5D:
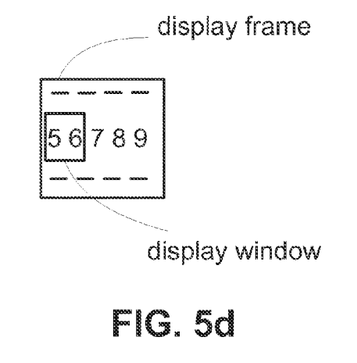
Figure 5E:
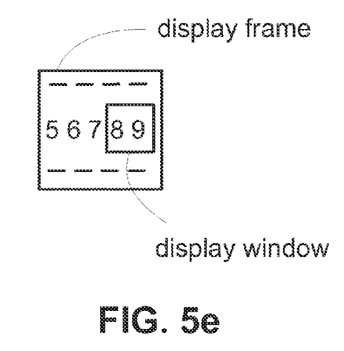
Figure 5F:
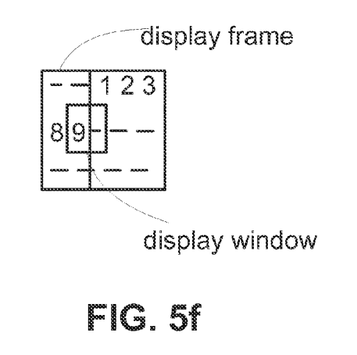

FIGS. 5a-5f illustrate another embodiment of displaying the file, in case that the display frame is smaller than the file (FIGS. 5a and 5b). When the display window reaches the rightmost part of the display frame (FIG. 5c), the displaying module 204 may copy a new part of the file onto the display frame and the display window may automatically move to the leftmost side of the display frame (FIG. 5d). However, after the display window reaches the rightmost side of the display frame and the user desires to continue viewing the file (FIG. 5e), the displaying module 204 may copy the rightmost part of the file and the leftmost part of the file onto the display frame, in which the leftmost part may be placed on the right of the rightmost part of the file. Preferably, either of the rightmost part and the leftmost part may have a width at least as same as the display window, so that the user may feel no disturbance of the display.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

EXAMPLES

Illustrative examples of the devices, systems, and methods disclosed herein are provided below. An embodiment of the devices, systems, and methods may include any one or more, and any combination of, the examples described below.

In one example, an apparatus for displaying a file on a mobile communication device may comprise a duplicating module to duplicate at least a leftmost part of a file to obtain a duplicated leftmost part of the file; and a displaying module to display a frame through moving a display window along the frame, the frame comprising a rightmost part of the file and the duplicated leftmost part of the file, wherein the duplicated leftmost part of the file is placed on right of the rightmost part of the file.

Additionally, in an example, the apparatus may further comprise a movement control module to control the display window to automatically move to a leftmost side of the frame, if the display window moves to a rightmost side of the frame. Additionally, in any of the above examples, the movement control module may control the display window to automatically move to the leftmost side of the frame, further in response to a user instruction of continuing viewing the file.

Additionally, in any of the above examples, the duplicated leftmost part of the file may be at least as wide as the display window. Additionally, in any of the above example, the rightmost part of the file may be at least as wide as the display window. Additionally, in any of the above examples, the duplicating module may further place a space or a mark between the rightmost part of the file and the duplicated leftmost part of the file. Additionally, in any of the above examples, the duplicating module may further move the duplicated leftmost part of the file up about one line before placing the duplicated leftmost part of the file on the right of rightmost part of the file.

In another example, a method for displaying a file on a mobile communication device may comprise duplicating at least a leftmost part of a file to obtain a duplicated leftmost part of the file; and displaying a frame through moving a display window along the frame, the frame comprising a rightmost part of the file and the duplicated leftmost part of the file, wherein the duplicated leftmost part of the file is placed on right of the rightmost part of the file.

Additionally, in an example, the method may further comprise controlling the display window to automatically move to a leftmost side of the frame, if the display window moves to a rightmost side of the frame. Additionally, in any of the above examples, the controlling the display window to automatically move to the leftmost side of the frame may be performed, further in response to a user instruction of continuing viewing the file. Additionally, in any of the above examples, the duplicated leftmost part of the file may be at least as wide as the display window. Additionally, in any of the above examples, the rightmost part of the file may be at least as wide as the display window.

Additionally, in any of the above examples, the method may further comprising placing a space or a mark between he rightmost part of the file and the duplicated leftmost part of the file. Additionally, in any of the above examples, the method may further comprising moving the duplicated leftmost part of the file up about one line before placing the duplicated leftmost part of the file on the right of rightmost part of the file.

What is claimed is:

1. An apparatus, comprising:
one or more processors to implement:
a duplicating module to duplicate at least a leftmost part of a file to obtain a duplicated leftmost part of the file;
a displaying module to display a frame through moving a display window in a first direction along the frame, the frame comprising a rightmost part of the file and the duplicated leftmost part of the file, wherein the duplicated leftmost part of the file is placed on right of the rightmost part of the file; and
a movement control module to (i) calculate a position of a rightmost side of the frame where the duplicated leftmost part of the file ends, (ii) detect that the display window moved to the calculated position, and (iii) control, in response to the detection that the display window moved to the calculated position, the display window to automatically move in a second direction, opposite the first direction, until the display window is at a leftmost side of the frame to display the leftmost part of the file.

2. The apparatus of claim 1, wherein the movement control module is to control the display window to automatically move to the leftmost side of the frame without receiving a user instruction to move the display window in the second direction.

3. The apparatus of claim 2, wherein the movement control module is to control the display window to automatically move to the leftmost side of the frame, further in response to a user instruction to move the display window in the first direction.

4. The apparatus of claim 1, wherein the duplicated leftmost part of the file is at least as wide as the display window.

5. The apparatus of claim 1, wherein the rightmost part of the file is at least as wide as the display window.

6. The apparatus of claim 1, wherein the duplicating module is further to place a space or a mark between the rightmost part of the file and the duplicated leftmost part of the file.

7. The apparatus of claim 1, wherein the duplicating module is further to move the duplicated leftmost part of the file up about one line before placing the duplicated leftmost part of the file on the right of rightmost part of the file.

8. A method, comprising:
   duplicating at least a leftmost part of a file to obtain a duplicated leftmost part of the file;
   displaying a frame through moving a display window in a first direction along the frame, the frame comprising a rightmost part of the file and the duplicated leftmost part of the file, wherein the duplicated leftmost part of the file is placed on right of the rightmost part of the file;
   calculating a position of a rightmost side of the frame where the duplicated leftmost part of the file ends;
   detecting that the display window moved to the calculated position; and
   controlling in response to the detection that the display window moved to the calculated position, the display window to automatically move in a second direction, opposite the first direction, until the display window is at a leftmost side of the frame to display the leftmost part of the file.

9. The method of claim 8, further comprising controlling the display window to automatically move to the leftmost side of the frame without receiving a user instruction to move the display window in the second direction.

10. The method of claim 9, wherein the controlling the display window to automatically move to the leftmost side of the frame is performed, further in response to a user instruction to move the display window in the first direction.

11. The method of claim 8, wherein the duplicated leftmost part of the file is at least as wide as the display window.

12. The method of claim 8, wherein the rightmost part of the file is at least as wide as the display window.

13. The method of claim 8, further comprising placing a space or a mark between the rightmost part of the file and the duplicated leftmost part of the file.

14. The method of claim 8, further comprising moving the duplicated leftmost part of the file up about one line before placing the duplicated leftmost part of the file on the right of rightmost part of the file.

15. One or more non-transitory machine readable storage media comprising a plurality of instructions that in response to being executed cause a computing device to:
   duplicate at least a leftmost part of a file to obtain a duplicated leftmost part of the file;
   display a frame through moving a display window in a first direction along the frame, the frame comprising a rightmost part of the file and the duplicated leftmost part of the file, wherein the duplicated leftmost part of the file is placed on right of the rightmost part of the file;
   calculate a position of a rightmost side of the frame where the duplicated leftmost part of the file ends;
   detect that the display window moved to the calculated position; and
   control in response to the detection that the display window moved to the calculated position, the display window to automatically move in a second direction, opposite the first direction, until the display window is at a leftmost side of the frame to display the leftmost part of the file.

16. The non-transitory machine readable media of claim 15, further comprising a plurality of instructions that in response to being executed cause the computing device to control the display window to automatically move to the leftmost side of the frame without receiving a user instruction to move the display window in the second direction.

17. The non-transitory machine readable media of claim 16, wherein to control the display window to automatically move to the leftmost side of the frame is performed, further in response to a user instruction to move the display window in the first direction.

18. The non-transitory machine readable media of claim 15, wherein the duplicated leftmost part of the file is at least as wide as the display window.

19. The non-transitory machine readable media of claim 15, wherein the rightmost part of the file is at least as wide as the display window.

20. The non-transitory machine readable media of claim 15, further comprising a plurality of instructions that in response to being executed cause the computing device to place a space or a mark between the rightmost part of the file and the duplicated leftmost part of the file.

21. The non-transitory machine readable media of claim 15, further comprising a plurality of instructions that in response to being executed cause the computing device to move the duplicated leftmost part of the file up about one line before placing the duplicated leftmost part of the file on the right of rightmost part of the file.

* * * * *